United States Patent
Brombach et al.

(10) Patent No.: US 11,566,603 B2
(45) Date of Patent: Jan. 31, 2023

(54) METHOD OF CONTROLLING A WIND FARM

(71) Applicant: Wobben Properties GmbH, Aurich (DE)

(72) Inventors: Johannes Brombach, Berlin (DE); Swantje Amelsberg, Berne (DE); Kai Busker, Großefehn (DE)

(73) Assignee: Wobben Properties GmbH, Aurich (DE)

( * ) Notice: Subject to any disclaimer, the term of this patent is extended or adjusted under 35 U.S.C. 154(b) by 0 days.

(21) Appl. No.: 17/108,844

(22) Filed: Dec. 1, 2020

(65) Prior Publication Data
US 2021/0164443 A1 Jun. 3, 2021

(30) Foreign Application Priority Data
Dec. 3, 2019 (DE) .......................... 102019132786.5

(51) Int. Cl.
*F03D 9/00* (2016.01)
*H02P 9/04* (2006.01)
(Continued)

(52) U.S. Cl.
CPC ........... *F03D 7/048* (2013.01); *F03D 7/0284* (2013.01); *F03D 9/257* (2017.02);
(Continued)

(58) Field of Classification Search
CPC ................. F03D 9/257; F05B 2260/821; F05B 2270/107
See application file for complete search history.

(56) References Cited

U.S. PATENT DOCUMENTS 8,588,987 B2 * 11/2013 Riesberg ................. F03D 7/048
700/287
9,026,258 B2 * 5/2015 Stapelfeldt .............. H02J 3/386
700/287
(Continued)

FOREIGN PATENT DOCUMENTS

DE 102007018888 A1 10/2008
DE 102011081446 A1 2/2013
(Continued)

*Primary Examiner* — Tulsidas C Patel
*Assistant Examiner* — Thomas K Quigley
(74) *Attorney, Agent, or Firm* — Seed IP Law Group LLP (57) ABSTRACT

Provided is a method of feeding electric reactive power using a wind farm comprising wind turbines. The wind farm feeds a wind farm active power output and the wind farm active power output includes individual plant active power outputs each generated by one of the wind turbines. The wind farm feeds a wind farm reactive power output into the electrical supply network and the wind farm reactive power output includes individual plant reactive power outputs each generated by one of the wind turbines. The method includes determining a total wind farm reactive power output to be fed in by the wind farm and calculating, for each wind turbine, an individual plant reactive power output to be generated. The individual plant reactive power output is determined depending on the individual plant active power output and depending on the wind farm reactive power output to be fed in.

16 Claims, 5 Drawing Sheets

(51) Int. Cl.
  *F03D 7/04* (2006.01)
  *F03D 9/25* (2016.01)
  *F03D 7/02* (2006.01)
(52) U.S. Cl.
  CPC ... *F05B 2220/706* (2013.01); *F05B 2260/821* (2013.01); *F05B 2270/107* (2013.01)

(56) References Cited

U.S. PATENT DOCUMENTS

| | | | |
|---|---|---|---|
| 9,985,561 B2* | 5/2018 | Diedrichs | F03D 9/255 |
| 10,063,061 B2 | 8/2018 | Bartsch | |
| 10,724,500 B2* | 7/2020 | Beekmann | F03D 7/0284 |
| 11,043,817 B2* | 6/2021 | Cassoli | H02J 3/18 |
| 11,085,418 B2* | 8/2021 | Giertz | F03D 7/028 |
| 2009/0160187 A1* | 6/2009 | Scholte-Wassink | F03D 7/048 |
| | | | 290/44 |
| 2010/0002475 A1* | 1/2010 | Folts | H02J 9/062 |
| | | | 363/37 |
| 2010/0332040 A1* | 12/2010 | Garcia | F03D 7/048 |
| | | | 700/287 |
| 2011/0182093 A1* | 7/2011 | Brogan | H02M 1/12 |
| | | | 363/79 |
| 2012/0010755 A1* | 1/2012 | Stapelfeldt | H02J 13/00016 |
| | | | 700/287 |
| 2012/0061959 A1* | 3/2012 | Yasugi | H02P 9/10 |
| | | | 290/44 |
| 2012/0248772 A1* | 10/2012 | Shigemizu | H02J 3/16 |
| | | | 290/44 |
| 2014/0062086 A1* | 3/2014 | Mata Dumenjo | H02J 3/50 |
| | | | 290/44 |
| 2014/0225446 A1 | 8/2014 | Giertz | |
| 2015/0275862 A1* | 10/2015 | Babazadeh | F03D 7/00 |
| | | | 290/44 |
| 2015/0280629 A1* | 10/2015 | Diedrichs | F03D 7/0284 |
| | | | 290/44 |
| 2015/0345468 A1 | 12/2015 | Schubert | |

FOREIGN PATENT DOCUMENTS

| | | |
|---|---|---|
| DE | 102012210613 A1 | 12/2013 |
| DE | 102013210812 A1 | 12/2014 |
| DE | 102015122640 A1 | 6/2017 |
| DE | 102018108023 A1 | 10/2019 |
| EP | 2355317 A1 | 8/2011 |
| EP | 2933478 A1 | 10/2015 |
| EP | 3280021 A1 | 2/2018 |
| WO | 2014/194914 A1 | 12/2014 |

* cited by examiner

Fig. 5

METHOD OF CONTROLLING A WIND FARM

BACKGROUND

Technical Field

The present invention relates to a method of feeding reactive electric power into an electrical supply network by means of a wind farm comprising a plurality of wind turbines. The present invention also relates to a wind farm capable of carrying out such a method.

Description of the Related Art

Wind farms in which a plurality of wind turbines are installed that collectively feed electric power into an electrical supply network via a common grid connection point are known from the prior art. Such wind farms can be used in addition to support and/or control the electrical supply network. One option in that regard is for such wind farms to feed reactive power into the electrical supply network, in particular to provide voltage support and/or voltage regulation of the grid voltage of the electrical supply network, in any case in the area of the common grid connection point, or to support the grid operator's reactive power management.

To that end, a wind farm is generally given specifications for feeding electric reactive power. These specifications can consist in an explicit value being specified, for example by a grid operator, but such a specification can also depend directly on the grid voltage. For example, the amount of reactive power to be fed in can be calculated according to a deviation of the grid voltage from a nominal grid voltage, in which case the reactive power to be fed in is then specified via the grid voltage.

However, the infeed of electric power and thus also of electric reactive power is typically controlled in wind farms via the individual wind turbines. The reactive power fed in by the wind farm is thus composed of various partial reactive power outputs supplied by the individual wind turbines.

The total reactive power to be fed into the grid by the wind farm is therefore distributed among the individual wind turbines. If all the wind turbines in the wind farm are identical, each wind turbine can assume an equal share. For example, if the wind farm has ten identical wind turbines, each wind turbine can provide one tenth of the total reactive power to be fed in.

However, it may be the case that the wind turbines are not identical, but rather are characterized by different rated powers, inter alia. For example, of the ten wind turbines mentioned as an example, five may each have a rated power of 1 MW (megawatts), whereas the remaining five wind turbines may have a rated power of 4 MW, for example. Division into ten identical shares might not make sense in that case. This problem can be addressed by taking these rated powers into account when distributing the total reactive power to be generated. Nevertheless, it may still be problematic, for example, if a wind turbine is shut down due to maintenance being carried out.

The German Patent & Trademark Office, in the priority application to the present patent application, has researched the following prior art: DE 10 2013 210 812 A1; DE 10 2007 018 888 A1 and DE 10 2018 108 023 A1.

BRIEF SUMMARY

As described herein a total reactive power to be fed in by a wind farm is distributed appropriately among the individual wind turbines. Provided is a method comprising feeding of electric reactive power into an electrical supply network at a grid connection point by means of a wind farm comprising a plurality of wind turbines. A plurality of wind turbines are thus combined in one wind farm and they feed power into the electrical supply grid via the grid connection point. All those wind turbines which feed power into the electrical supply grid via this grid connection point can be understood as part of this wind farm, so the grid connection point can also be referred to as a common grid connection point.

The wind farm feeds a wind farm active power output into the electrical supply network, and the wind farm active power output is composed of individual plant active power outputs which are each generated by one of the wind turbines. Each wind turbine thus generates an active power output specific to that wind turbine, which is referred to as plant active power output, and these plant active power outputs of all the wind turbines of the wind farm are combined, in particular added together to form a wind farm active power output. This wind farm active power is fed into the electrical supply network. To simplify matters, losses between the wind turbines and the grid connection point are initially neglected.

The wind farm similarly feeds a wind farm reactive power output into the electrical supply network, and the wind farm reactive power output is composed of individual plant reactive power outputs which are each generated by one of the wind turbines. This means that the reactive power output is generated individually by each wind turbine, and this reactive power output generated by each wind turbine is referred to as the plant reactive power output. Together, all the plant reactive power outputs of the wind turbines in the wind farm then form the wind farm reactive power output. In particular, the wind farm reactive power output is a sum of the plant reactive power outputs that are individually generated. It is assumed here also that there are no losses and also no phase shifts between the individual wind turbines and the grid connection point.

One step of the method for feeding electric reactive power is to calculate a total wind farm reactive power output to be fed in by the wind farm. This calculation can be done in such a way that a setpoint value for the wind farm reactive power output to be fed in is obtained from an external source. However, another possible option is that the wind farm reactive power output to be fed in, which can also be referred to synonymously as the wind farm reactive power setpoint, is calculated depending on a grid voltage or grid voltage deviation of the electrical supply network. One option, in particular, is to calculate the wind farm reactive power output to be fed in according to a deviation of the grid voltage from a nominal grid voltage of the electrical supply network.

It is proposed, as a further step, that a plant reactive power output to be generated by the respective wind turbine is calculated for each wind turbine. In this regard, it is proposed that the individual plant reactive power output to be generated is calculated for each wind turbine depending on its individual plant active power output and depending on the wind farm reactive power output to be fed in. Thus, by taking into account the above points regarding the wind farm reactive power output to be fed in, it is possible to ensure that all the wind turbines, taken together, ultimately do in fact generate the wind farm reactive power output to be fed in.

It is proposed, for the distribution of this wind farm reactive power output to be fed in among the individual wind turbines, that this be determined according to the active power output, namely the active power output that each individual wind turbine is generating at that moment. So if, for example, a wind turbine generates twice as much active power as another wind turbine in the wind farm is generating at that moment, then one option, to use a simple example, is for this one wind turbine to generate twice as much reactive power as the other wind turbine. In this case, the plant reactive power output to be generated by this one wind turbine would be set at twice the value of the plant reactive power output to be generated by the other wind turbine. The plant reactive power output to be generated can also be referred to synonymously as the plant reactive power setpoint.

With this proposal, it is now possible to take into account not only the wind turbine variables specific to each wind turbine, but also the current production activity, when distributing the wind farm reactive power output to be generated. This is based in particular on the realization that reactive power can be generated particularly efficiently, i.e., with comparatively little power loss, when the active power generated is similarly large. If, in contrast, it is necessary to generate a relatively large amount of reactive power which is greater, for example, than the active power generated by the respective wind turbine, then generating such a reactive power output will involve relatively large losses. It is proposed here, therefore, that the actual plant active power output be taken into account when calculating the individual plant reactive power setpoints. In this way, it is possible to prevent some power plants from having to generate a relatively high reactive power output while generating hardly any active power, which would result in greater power losses than if at least part of this reactive power to be generated is generated instead by wind turbines which generate relatively large amounts of active power.

It is proposed, in particular, that the individual plant reactive power output to be generated is calculated depending on all the individual plant active power outputs. This means that, for each wind turbine, consideration is given not only to the respective plant active power output, but rather to the respective active power outputs generated by all the wind turbines. In this way, it is possible to make particularly good adjustments when distributing the plant reactive power outputs to be generated.

The method thus relates to distribution of a reactive power setpoint among the individual wind turbines in the wind farm. Another option, however, and this applies to all the embodiments, is that the wind farm is designed as a hybrid farm, i.e., that in addition to wind turbines, there are additional power generation plants that form part of the wind farm, in particular that there are additional regenerative power generation plants. Such additional power generation plants may be photovoltaic systems, in particular. The method is also particularly worthwhile for such a hybrid farm, because the different forms of primary energy, i.e., wind and solar radiation, can result in strong differences in plant active power output, also in relation to the rated power of the respective power plants.

For example, on a summer day with little wind, each and every photovoltaic system is able to generate its rated power, whereas each wind turbine might only operate at around 30% of its rated power.

All the embodiments and descriptions below are also applicable to the hybrid farm and to the additional power generation plants. Each description of a wind farm can also be read as a corresponding description of a hybrid farm. Each description of a wind turbine can also be read as a corresponding description of an additional power generation plant, in particular of a photovoltaic system. Each description of a plurality of wind turbines can also be read as a corresponding description of one or more wind turbines in combination within one or more additional power generation plants.

According to one embodiment, the individual reactive power outputs are determined and generated in such a way that the sum of all the individual reactive power outputs is equal to the wind farm reactive power output. It is thus proposed that the wind farm reactive power output that is actually fed in is also taken into account. It may be stipulated, for example, that all the individual plant reactive power outputs be calculated first of all and are then actually generated as well. Their total should be equal to the calculated wind farm reactive power output. Fluctuations and losses, especially between the power plants and the grid connection point, and which are therefore taken into account in such a case, can result in the reactive power actually fed in not being exactly equal to the sum of the individual plant reactive power outputs. There is then a deviation between the wind farm reactive power to be fed in and the wind farm reactive power that is actually fed in. This difference can be compensated for, for example by recalculating all the individual plant reactive power outputs to be fed in, or by adjusting, uniformly or by means of some other scheme, the calculated plant reactive power outputs to be generated, so as to eliminate, in particular to compensate for the difference between a wind farm reactive power to be fed in and the wind farm reactive power that is actually fed in.

According to another embodiment, it is proposed that calculation of the individual plant reactive power output $Q_{N,S}$ depending on the wind farm reactive power output $Q_{G,S}$ to be fed in, a total wind farm reactive power output $P_{GA}$ to be fed in, and the individual plant active power outputs $P_{N,A}$ that are respectively fed in, be determined according to the equation: $Q_{N,S}=(P_{N,A}/P_{G,A})*Q_{G,S}$, where index N refers in each case to the wind turbine under consideration.

Thus, in order to calculate the individual plant reactive power output, the reactive power output $P_{N,A}$ currently being fed in by the same wind turbine is set in relation to the wind farm active power output $P_{G,A}$ that is currently being fed in. This ratio is then the share of the reactive power to be generated by the same wind turbine, therefore. This share is multiplied accordingly by the total wind farm reactive power output $Q_{G,S}$ to be fed in. The result is therefore that the individual plant reactive power output to be generated by each wind turbine is calculated according to the active power component generated by the same wind turbine. This ensures that the reactive power to be fed in is based in each case on the active power fed in by the same wind turbine and thus prevents a wind turbine having to feed in a disproportionately large amount of reactive power. Corresponding losses are thus prevented.

The individual reactive power output is preferably calculated by a central wind farm control unit (controller). Such a central wind farm control unit can determine, for example by receiving from an external source via an interface, a total wind farm reactive power output to be fed in by the wind farm, and is in communication with each of the wind turbines. By means of such communication, the central wind farm control unit can transmit the respectively calculated individual plant reactive power output to the respective wind turbine. If necessary, the central wind farm control unit can also fetch the individual plant active power output $P_{N,A}$ currently being fed in from the respective wind turbine, i.e., from wind turbine N, and use that to calculate the individual plant reactive power outputs to be generated.

According to one embodiment, the individual plant reactive power output is calculated depending additionally on the wind farm reactive power that is actually fed in. In this way, any deviation between the total wind farm reactive power to be fed in by the wind farm and the wind farm reactive power that is actually fed in can be corrected or compensated for by adjusting the individual plant reactive power outputs to be generated.

According to one embodiment, a ratio of the individual plant reactive power output to the individual plant active power output is the same for each wind turbine. In particular, the individual plant reactive power output to be generated is calculated for each wind turbine accordingly. In this way, it is possible to minimize the losses incurred when generating the plant reactive power outputs and in particular the sum of losses incurred in generating all the plant reactive power outputs in the wind farm.

According to one embodiment, each individual plant reactive power output is calculated from the wind farm reactive power output to be fed in by using an individual conversion function, wherein the conversion function is composed of at least one predeterminable basic value which is individual for each wind turbine, and a variable weighting which is individual for each wind turbine, wherein the variable weighting is calculated depending on the individual plant active power output of the associated wind turbine.

In particular, the individual conversion function can be a variable factor, such that the plant reactive power output is calculated from the product of this conversion function and the wind farm reactive power output. As a factor, this conversion function consists for its part of the individual basic value and the individual weighting, as two factors.

This is based in particular on the idea that a first relationship, which can also be referred to as a first approximation, can be defined using the basic value. In a first calculation of the individual plant reactive power output, in particular when the wind farm or the respective wind turbine has just been started up, the individual weighting can have the value 1 as a starting value. The wind power of the wind turbine is then calculated solely from the wind farm reactive power output to be fed in and the individual basic value.

In addition, however, the variable individual weighting can then be calculated depending on the individual plant active power output of the associated, i.e., respective wind turbine. To express this clearly, if the individual plant active power output of the one wind turbine is particularly low, this can be taken into account via the individual weighting, which, based on the example above, can then be reduced from the starting value of 1. However, the starting value can also be the most recent weighting value. Conversely, if the individual plant active power output is relatively high, the individual weighting can also be increased accordingly, even beyond the value 1.

It is proposed, in particular, that each individual plant reactive power output $Q_{N,S}$ to be set is calculated from the wind farm reactive power $Q_{G,S}$ according to the calculation rule $Q_{G,S} = k_N * G_N * Q_{G,S}$, with $k_N$ as the basic value and $G_N$ as the weighting, with index N indicating the respective wind turbine in each case, wherein each wind turbine N is characterized by a plant rated power $P_{N,R}$, the wind farm is characterized by a wind farm rated power $P_{G,R}$ which results as the sum of all the plant rated powers $P_{N,R}$, and the basic value $k_N$ in each case is a ratio of the plant rated power $P_{N,R}$ to the wind farm rated power $P_{G,R}$, and/or the variable weighting $G_N$ results from a ratio or describes a ratio between the ratio of the plant active power output $P_{N,A}$ to the wind farm active power output $P_{G,A}$ and the ratio of the plant rated power $P_{N,R}$ to the wind farm rated power $P_{G,R}$, in particular using the equation: $G_{N,0} = (P_{N,A}/P_{G,A})/(P_{N,R}/P_{G,R})$, where $G_N = G_{N,0}$, or $G_N$ tracks $G_{N,0}$ using a dynamic function, in particular with PT1 behavior.

Each individual plant reactive power output can thus be calculated using this calculation rule. The conversion function is the product of $k_N$ and $G_N$. Particularly in a settled state, this product may be equal to the quotient $P_{N,A}/P_{G,A}$.

More particularly, the basic value $k_N$ is calculated in each case solely on the basis of the ratio between the rated powers. It is thus calculated individually for each separate wind turbine as a quotient of the rated power of the respective wind turbine in relation to the wind farm rated power, i.e., the sum of all the individual rated powers of the wind turbines. Such a basic value is a good approximation for good distribution of the wind farm reactive power output to be set and distributed.

However, in order to give additional consideration to the possibility of the active power actually generated by the individual wind turbines deviating, in terms of the total active power generated by the wind farm, from this first approximation which was calculated using the rated power, this can be taken into account using the variable individual weighting for each individual wind turbine. For the sake of simplicity, the variable individual weighting can also be referred to simply as a variable weighting or simply as a weighting. Nevertheless, there is a weighting for each wind turbine, and these weightings differ from each other, or at least may differ from each other.

This variable weighting thus depends on a double ratio, so to speak, such as the ratio of the plant active power output to the wind farm active power output, in relation to the ratio of the plant rated power to the wind farm rated power. In the ideal theoretical case, the ratio of the plant active power output to the wind farm active power output could be equal to the ratio of the plant rated power to the wind farm rated power.

During operation of the wind farm, however, such ideal conditions are frequently not present, for example because a topography of the wind farm causes different wind turbines to be exposed to different wind flows, for example That may also depend on the wind direction. In particular, there may also be wind farm effects where one wind turbine blocks wind flow to another, or to several other wind turbines, also to different extents in some cases. Four wind turbines having the same rated power may then produce different amounts of active power, for example if they are arranged unfavorably in a row such that the front wind turbine forms a wind shadow for the wind turbine behind it, which in turn reduces the wind speed for a wind turbine standing even further behind. The wind at the fourth wind turbine may be even weaker and/or even more turbulent.

This can be taken into account by taking the plant active power outputs that are actually generated into account. In the unfavorable example mentioned above, the respective ratios of plant active power output to wind farm active power output would then be different from that of the plant rated power to the wind farm rated power. For the wind turbine, referred to by way of example, that is fully in the wind this can also result in the ratio of plant active power output to wind farm active power output being greater than that of the plant rated power to the wind farm rated power, because if other wind turbines are in its wind shadow, the wind farm active power output of this wind turbine standing fully in the wind is reduced, without its plant active power output being reduced. The ratio of the plant active power output to the wind farm active power output then becomes greater, whereas the ratio of the plant rated power to the wind farm rated power does not change, of course, since both of the rated powers are fixed values.

This can be taken into account by using the aforementioned calculation, in which said double ratio is included. The ratio of the plant active power output to the wind farm active power output is thus set in relation to the ratio of the plant rated power to the wind farm rated power. This allows the variable weighting to be calculated.

It is preferable, however, that this weighting is not calculated immediately after every change in active power. That can be particularly undesirable, because it would result in constant variation in the plant reactive power setpoint value, which can affect the dynamics of the wind turbine. It is therefore proposed that said double ratio be included in the variable weighting via a dynamic function. In particular, this weighting tracks said double ratio via a dynamic function. Such a dynamic function can specifically be a PT1 behavior, i.e., a first-order lag. A first-order lag of this kind is relatively simple to implement, requires only one variable, namely a time constant, and has the advantage, in particular, that it cannot oscillate and therefore cannot generate any overshoots, either.

Preferably, a value of 5 seconds to 300 seconds, in particular a value in the range of 10 seconds to 30 seconds, can be proposed as a time constant for such dynamic tracking, in particular as a time constant for the aforementioned lag behavior. The fact that changing wind directions essentially change the ratios of the active power outputs generated, and that such variations in wind direction do not occur so quickly, has also been taken into account here. This means that fast tracking, too, is not absolutely necessary. Furthermore, there is hardly any risk of damage, either, should the weighting function be tracked too slowly, i.e., should the distribution of the wind farm reactive power to be distributed among the individual wind turbines be adjusted too slowly. In that case, there would be greater losses, which is undesirable but nevertheless has only a slight influence, especially on the annual yield, if weighting is tracked within the short periods mentioned.

According to one embodiment, when there is a change in the fed-in individual plant active power output, and/or in a or the fed-in wind farm active power output, the individual reactive power output is not adjusted until after a predetermined time lag and/or with additional application of a dynamic tracking function and/or by taking into account a current wind power of the wind farm.

The advantages of delayed adjustment of the individual plant reactive power output have already been described in connection with the variable weighting function, by means of which such delayed adjustment of the individual plant reactive power output can also be carried out well. However, other variants can also be considered, in which a conversion factor is applied directly as the quotient of the respective plant active power output to the wind farm active power output, for example, and this is tracked with a time lag if changes result in the plant active power output and/or in the wind farm active power, i.e., if changes in the quotient result. Another option is to track with a time lag and/or to detect or ascertain with a time lag any detected changes in the plant active power outputs and/or any detected changes in the wind farm reactive power to be fed in, and in this way to achieve a time-lagged change. The time lag may be configured here in the way that is described above for time-lagged adjustment of the individual plant reactive power output.

The current wind power of the wind farm can be taken into account in such a way, for example, that such a wind power of the wind farm is calculated on the basis of a detected or forecast wind condition, in particular on the basis of a wind condition forecast at short notice within a time range of up to one hour. This means there is no need for constant analysis of the active power actually generated by the individual wind turbines, thus relieving the pressure on communication within the wind farm.

According to one embodiment, the individual reactive power output to be generated is determined temporarily in each case from the wind farm reactive power to be fed in by using a predetermined default value, if at least one active power output is unavailable for calculating the individual reactive power output to be generated. In the event that communication in the wind farm is disrupted, such that the central wind farm control unit has no access to the current plant active power outputs of the individual wind turbines, it is still possible, therefore, to specify the individual plant reactive power outputs to be generated. It should be noted here that a simpler communication link may be available for transmitting such an individual plant reactive power output to be generated than for receiving the current plant reactive power output. It is possible, therefore, that communication in the wind farm is disrupted to such an extent that the central wind farm control unit cannot receive the values for the generated active power, but can still transmit setpoints for the plant reactive power outputs to be set.

Such a situation in which the central wind farm control unit cannot receive current active power outputs is rare, but in this case the wind farm can nevertheless be operated in a stable manner, and a specified wind farm reactive power can also be fed in.

Such a specified predetermined value for each individual plant reactive power output to be generated can be set by means of a variant which uses a conversion function composed of an individual basic value and a variable individual weighting, wherein the variable individual weighting can then take the value 1 in this case of communication failure. However, other possible ways of setting the value can be considered, for example in which the individual plant reactive power output is calculated, from the wind farm reactive power to be fed in, using the factor $P_{N,A}/P_{G,A}$, and if the plant active power output is not available, the factor can be temporarily replaced by the specified predetermined value. A period of less than five minutes, in particular of less than one hour, or less than one day at least, can be taken as temporary in this sense.

According to one variant, the individual plant reactive power output to be generated is additionally calculated depending on power line losses of the wind farm. Transmission lines are provided from the wind turbines to the grid connection point. Power losses can occur on these transmission lines, and these power losses can preferably be taken additionally into account when calculating each individual plant reactive power output to be generated.

One option to consider here, in particular, is for wind turbines in the wind farm that are erected further away from the grid connection point than other wind turbines to provide, i.e., generate, a lower reactive power than wind turbines which are closer to the grid connection point, relative in each case to the particular transmission lines being used. For example, a wind turbine located furthest away from the grid connection point may be assigned an individual plant reactive power output to be generated that is reduced by a reduction factor, whereas the wind turbine closest to the grid connection point is assigned an individual plant reactive power output to be generated that is increased by this correction amount. In this way, the respective individual plant reactive power output to be generated is still calculated for each wind turbine depending on its individual plant active power output, but is additionally adjusted depending on the power line losses of the wind farm.

The individual reactive power output to be generated is preferably calculated depending additionally on at least one criterion selected from the list comprising:

power losses of the wind farm;

a cable factor which takes into account, as a weighting factor, the distance of the wind turbine to the grid connection point, or a grid attenuation, or a grid gain of an introduced reactive current;

a fixed converter factor which is specified depending on an infeed unit, in particular on an inverter, and which takes into account, as a weighting factor, a predefined converter efficiency;

a dynamic converter factor which takes into account the currently detected properties of the infeed unit, in particular of the inverter, in particular a currently detected efficiency of the infeed unit;

an overload factor which takes into account the duration and/or magnitude of an overload;

an expected or forecast power output; and a reserve factor which takes into account possible changes in active power generation in order to perform a system service.

The cable factor thus depends on the distance between the wind turbine and the grid connection point. The closer to the grid connection point the wind turbine is located, the greater the cable factor that can be selected for it. One option in particular is that such a cable factor has an average value of 1 for the entire wind farm. If the distance between the turbine and the grid connection point is particularly large, the weighting factor is less than 1, and if the distance is particularly small, the weighting factor is greater than 1. The individual plant reactive power output to be generated by the wind turbine concerned is multiplied accordingly by this cable factor and is correspondingly higher or lower as a result. The cable factor preferably ranges between 0.5 and 1.5, in particular between 0.8 and 1.2.

A fixed converter factor is a factor that depends on fixed values of the infeed unit, in particular such values as can be taken from a respective data sheet of the infeed unit, i.e., of the inverter in particular. The converter efficiency is an example of such a characteristic. If the latter is high, a higher value can be specified for the individual plant reactive power output to be generated.

A dynamic converter factor is one that takes into account currently registered characteristics of the infeed unit, in particular of the inverter.

An overload factor takes into account the duration and/or magnitude of an overload, so if a wind turbine is in an overload condition, it may have to provide less reactive power. This may depend on how long the overload condition has existed and how intense it is. It may also depend on the situation in the other wind turbines.

Calculating the individual plant reactive power output to be generated may also depend on an anticipated or forecast power level. In this regard, it is proposed that an anticipated or forecast active power is used instead of a registered plant active power output. Short-term forecasts and/or forecasts obtained via a LIDAR system can be considered in this regard. By means of such a LIDAR system, a wind speed can be sensed a few hundred meters in front of the wind turbine, and such a forecast derived from such a wind speed detected using LIDAR can be taken into account when calculating the individual plant reactive power output to be generated.

A reserve factor can take into account possible changes in active power generation in order to perform a system service, in particular in such a way that the individual plant reactive power to be generated is reduced in comparison with an individual plant reactive power which does not take a reserve factor into account. The individual plant power output may thus be less with a reserve factor than without a reserve factor.

A system service may necessitate a sudden or at least rapid change in the active power fed into the grid. One example of such a system service is the provision of instantaneous power. Particularly when the active power is increased, this can lead to such a level of capacity utilization that the individual plant reactive power output to be generated by the respective wind turbine cannot be generated or provided or transmitted fully.

To prevent this happening, the individual plant reactive power output, to take a simple example, can be reduced somewhat in a first wind turbine that feeds in a lot of active power relative to its rated power. In order to compensate for this, an individual plant reactive power output can be increased somewhat in a second wind turbine that feeds in only little active power relative to its rated power. This can be taken into account by using the reserve factor.

A wind farm is also proposed. The wind farm has a plurality of wind turbines and is provided to feed electric reactive power into an electrical supply network at a grid connection point. The grid connection point can also be considered part of the wind farm. It is proposed that the wind farm be configured to be operated in such a way that it feeds wind farm active power output into the electrical supply network and the wind farm active power output is composed of individual plant active power outputs each generated by one of the wind turbines, and that it feeds a wind farm reactive power output into the electrical supply network and the wind farm reactive power output is composed of individual plant reactive power outputs each generated by one of the wind turbines, and the wind farm has a wind farm control unit which is configured to determine a total wind farm reactive power output to be fed in by the wind farm, to calculate, for each wind turbine, an individual plant reactive power output to be generated by the respective wind turbine, wherein the individual plant reactive power output calculated for each wind turbine is determined depending on its individual plant active power output and depending on the wind farm reactive power output to be fed in.

The wind farm active power output and also the wind farm reactive power are fed into the grid by the individual wind turbines each generating an individual plant active power output and an individual plant reactive power output, and by these power outputs being transmitted by the wind turbines to the grid connection point, where they are fed into the electrical supply network. Thus, the wind farm feeds in the sum of these individual power outputs.

The wind farm control unit can be designed as a computing unit having interfaces for communicating with the wind turbines. This allows the wind farm control unit to receive the respective values of the individual plant active power outputs from the wind turbines. The wind farm control unit also has an interface for calculating the total amount of wind farm reactive power to be fed in by the wind farm. This can be specified directly by an external source and inputted to the interface. Alternatively, the wind farm control unit can calculate such a wind farm reactive power output to be fed in, in particular depending on a detected grid voltage of the electrical supply network. Such detection can also be carried out via the interface.

The wind farm, in particular the wind farm control unit, is otherwise configured to carry out a method according to at least one of the embodiments described in the foregoing.

BRIEF DESCRIPTION OF THE SEVERAL VIEWS OF THE DRAWINGS

The invention shall now be described in greater detail with reference to the accompanying Figures, in which

FIG. 3 illustrates a conventional distribution, among individual plant reactive power outputs to be generated, of a wind farm reactive power to be fed in.

FIG. 4 illustrates a proposed distribution, among individual plant reactive power outputs to be generated, of a wind farm reactive power to be fed in.

DETAILED DESCRIPTION

Figure 1:
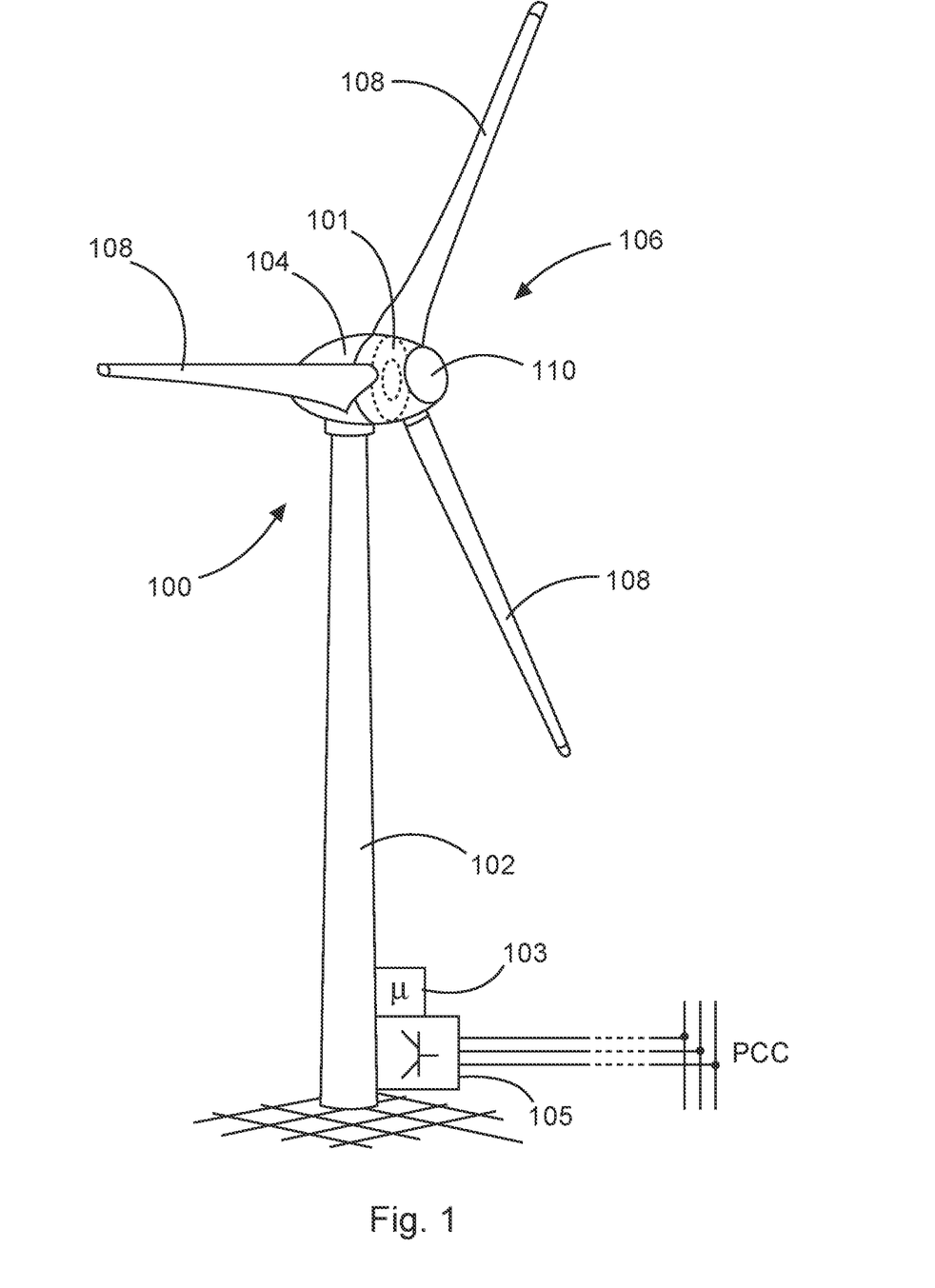
FIG. 1 shows a perspective view of a wind turbine.

FIG. 1 shows a wind turbine 100 comprising a tower 102 and a nacelle 104. A rotor 106 having three rotor blades 108 and a spinner 110 is arranged on nacelle 104. Rotor 106 is made to rotate by the wind and drives a generator in nacelle 104 as a result.

Wind turbine 100 has an electric generator 101, which is indicated in nacelle 104. Electric power can be generated by means of generator 101. An infeed unit 105, which can be in the form of an inverter, is provided for feeding electric power into the grid. This can be used to produce a three-phase infeed current and/or a three-phase infeed voltage having an amplitude, a frequency and a phase, for feeding into the grid at a grid connection point PCC. That can be done directly, or also collectively with other wind turbines in a wind farm. A system controller 103 is provided to control wind turbine 100 and also infeed unit 105. System controller 103 can also receive externally specified values, in particular from a central wind farm computer.

Figure 2:
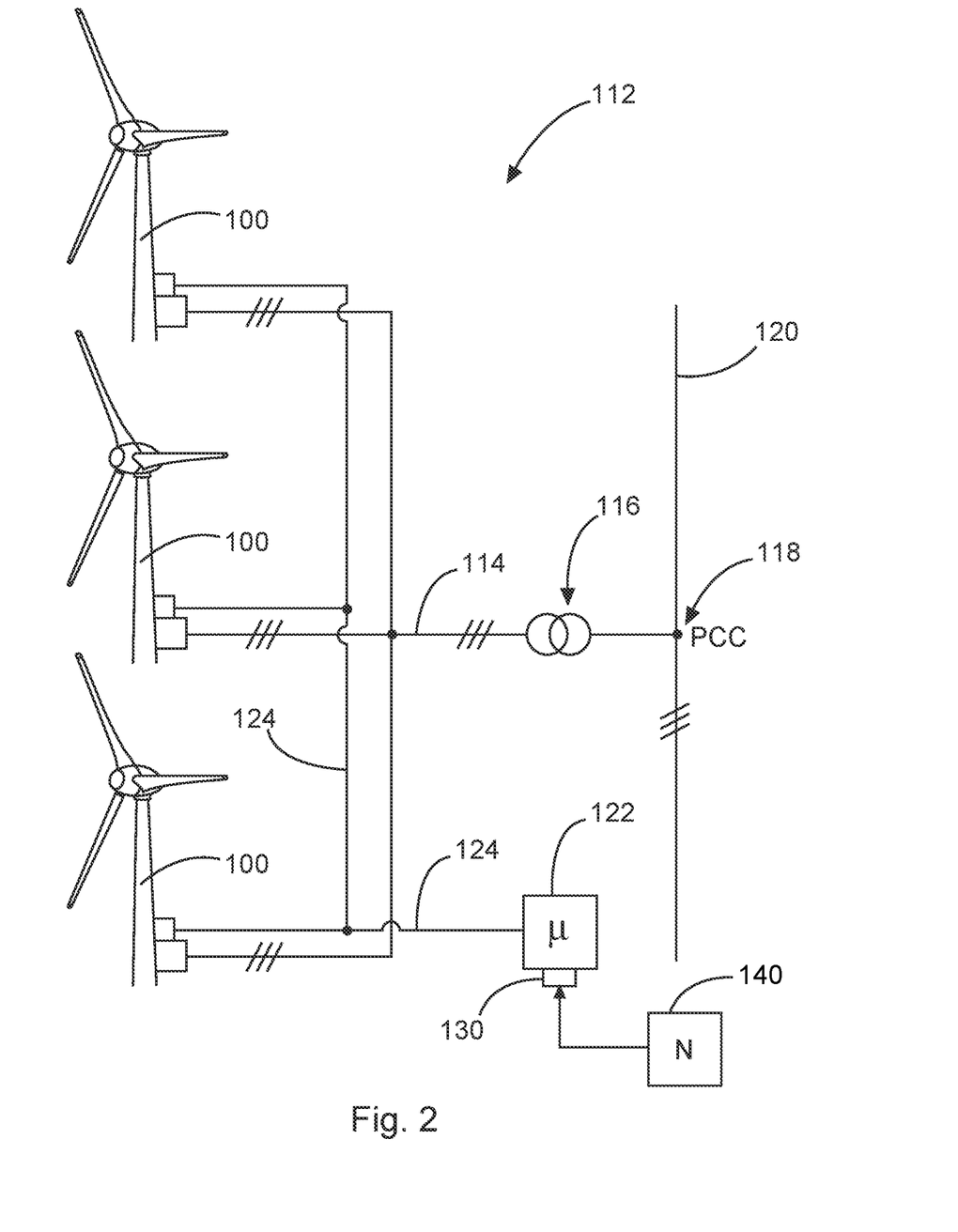
FIG. 2 shows a schematic view of a wind farm.

FIG. 2 shows a wind farm 112 comprising, in this example, three wind turbines 100, which may be identical or different. The three wind turbines 100 are thus representative of basically any number of wind turbines in a wind farm 112. Wind turbines 100 deliver their power, namely the generated current, via an electrical wind farm network 114. The respective current or power outputs respectively generated by the individual wind turbines 100 are added up, and a transformer 116 is usually provided that transforms the voltage in the wind farm in order to feed it into supply network 120 at infeed point 118, which is also referred to generally as the point of common coupling (PCC). FIG. 2 is only a simplified view of a wind farm 112. Wind farm network 114 may be designed differently, for example by a transformer also being provided at the output of each wind turbine 100, to mention just one other embodiment.

Wind farm 112 also has a central wind farm control unit 122. This can be connected to wind turbines 100 via data lines 124, or wirelessly, so as to exchange data with the wind turbines via those connections, in particular to receive measured values from wind turbines 100 and to transmit control values to wind turbines 100.

Wind farm control unit 122 also has an input interface 130. A value for the wind farm reactive power output to be fed in, i.e., a wind farm reactive power setpoint value, can thus be inputted into this input interface 130 from an external entity such as a grid operator 140. The wind farm reactive power setpoint value can also be referred to synonymously as the wind farm reactive power setpoint.

Figure 3:
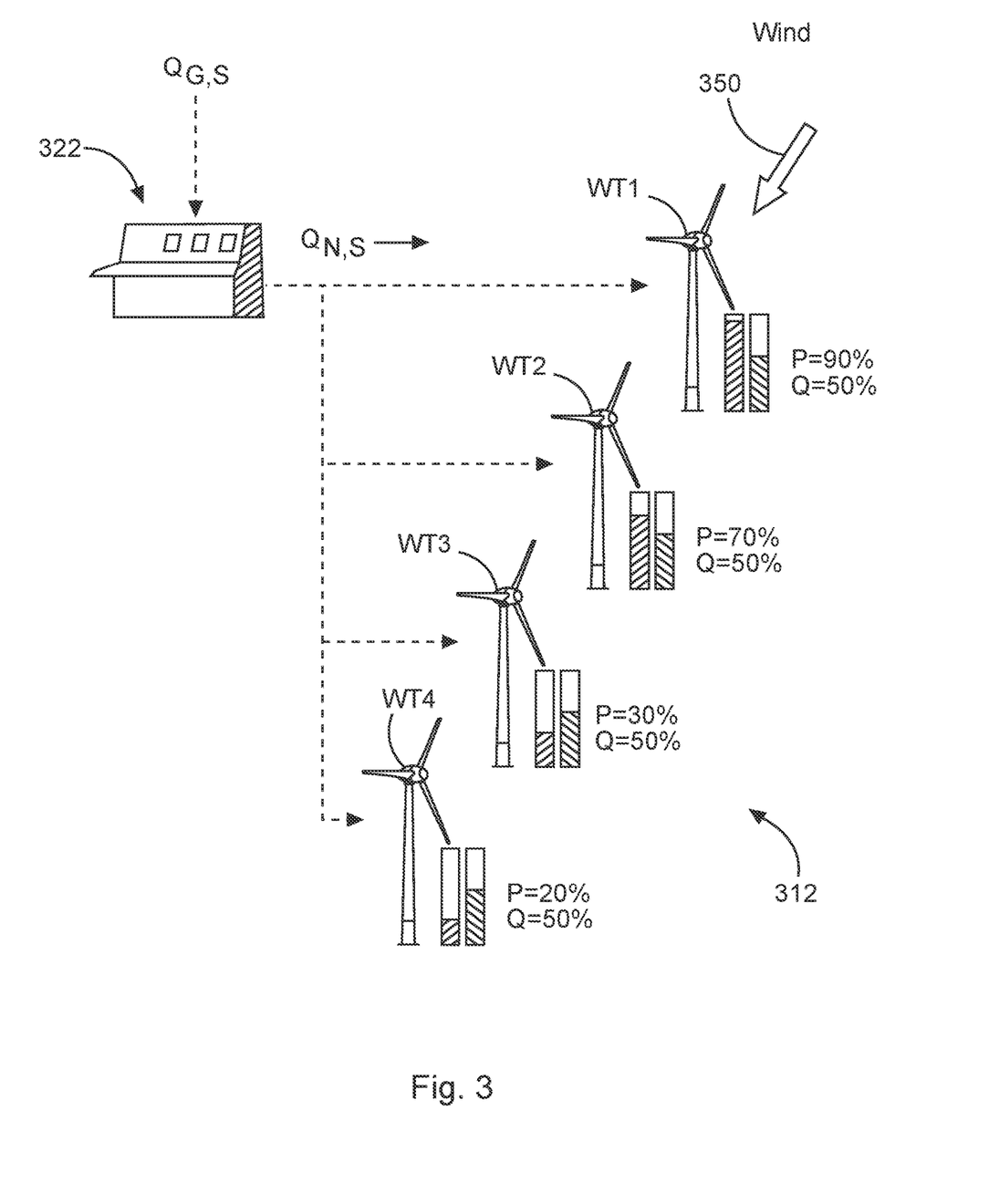

FIG. 3 likewise shows a schematic view of a wind farm 312 comprising first to fourth wind turbines WT1-WT4. For illustration purposes, these four wind turbines WT1-WT4 are arranged one behind the other in relation to a wind direction 350 drawn in here by way of example. It can be assumed for the sake of simplicity that the four wind turbines WT1-WT4 are of the same design and thus have the same rated power.

Wind farm 312 also has a wind farm control unit 322, which receives a setpoint value for a wind farm reactive power output to be fed in, which is referred to as $Q_{G,S}$. The wind farm control unit 322 uses that value to calculate individual plant reactive power outputs $Q_{N,S}$ to be generated. The calculation is carried out in such a way that wind turbines WT1-WT4 each receive the respective individual plant reactive power value corresponding to their rated power. In the example shown in FIG. 3, this value can be 50%, based on a reference value, for example the maximum reactive power that can be fed in by the respective wind turbine, or based on the rated power of the respective wind turbine.

In the example, the result is that each of the wind turbines WT1-WT4 is to generate and also does generate the same amount of reactive power. This is marked in the Figure as Q=50%.

In the illustrative example shown in FIG. 3, a case is assumed in which, in relation to the wind direction, wind turbines WT2-WT4 each stand behind or downwind of one or several previous wind turbines. It is assumed that the wind strength is sufficient for the first wind turbine WT1 to generate a power output P of 90%. This percentage value may refer to the rated power of the wind turbine.

Due to the wind shadow, it is assumed that the second wind turbine WT2 can generate only 70% (P=70%), the third wind turbine WT3 only 30% (P=30%) and finally that the fourth wind turbine WT4 can generate only 20% (P=20%).

These values may be overstated for better illustration, but they show that all the wind turbines WT1-WT4 must each generate the same amount of reactive power, namely 50% (Q=50%), whereas there are differences in the active power they generate. As a result, the first wind turbine WT1 generates a significantly greater active power component than reactive power component, whereas the fourth wind turbine WT4 generates a significantly greater reactive power component (Q=50%) than active power component (P=20%). Generation of reactive power by the fourth wind turbine WT4, in particular, is thus very prone to loss.

Figure 4:
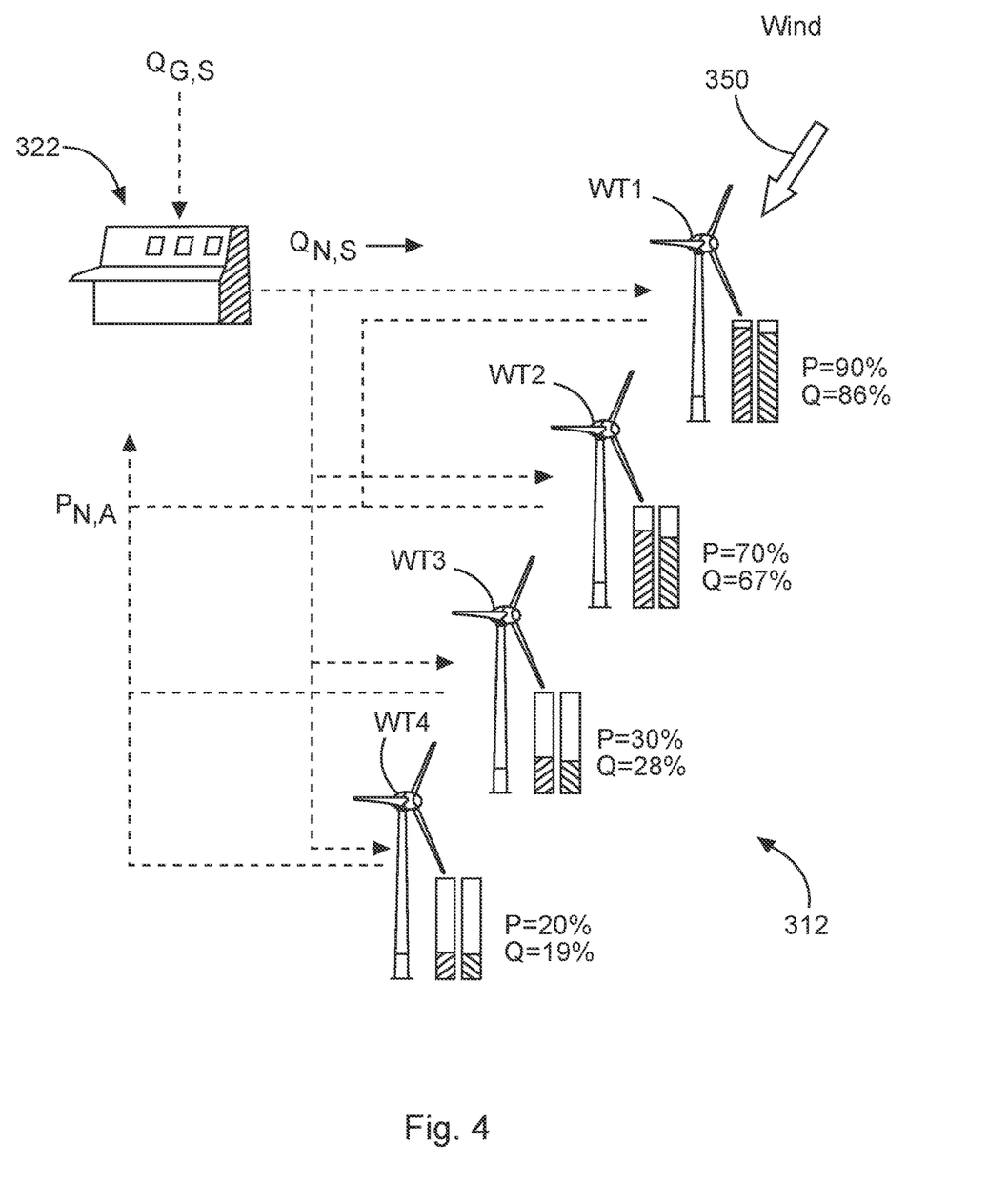

A solution for counteracting this is illustrated in FIG. 4. FIG. 4 shows a wind farm 312 which is essentially the same as the one in FIG. 3, so the same reference signs have been chosen. However, there is a difference in how the individual plant reactive power outputs are calculated, and also a difference in the communication between wind turbines WT1-WT4 and the wind farm control unit 322. The wind farm control unit 322 receives current values for the respective plant active power outputs $P_{N,A}$. Depending on those values, the plant reactive power outputs $Q_{N,S}$ to be generated are then generated individually. Here, too, the values for the respective individual plant reactive power output $Q_{N,S}$ to be generated are entered at wind turbines WT1-WT4 as actually generated reactive power outputs Q, in each case with percentage values.

It can thus be seen that the reactive power generated by wind turbines WT1-WT4 is now of approximately the same order of magnitude as the active power generated in each case. In any case, the ratio of reactive power Q to active power P is approximately the same for each of the wind turbines WT1-WT4, namely somewhat less than the value 1 in the example shown. The specific value is only an example, but what is important is that the ratio is approximately the same for all the wind turbines WT1-WT4. As a result, the generation of reactive power is improved with regard to minimization of losses in comparison with the manner shown in FIG. 3.

Figure 5:
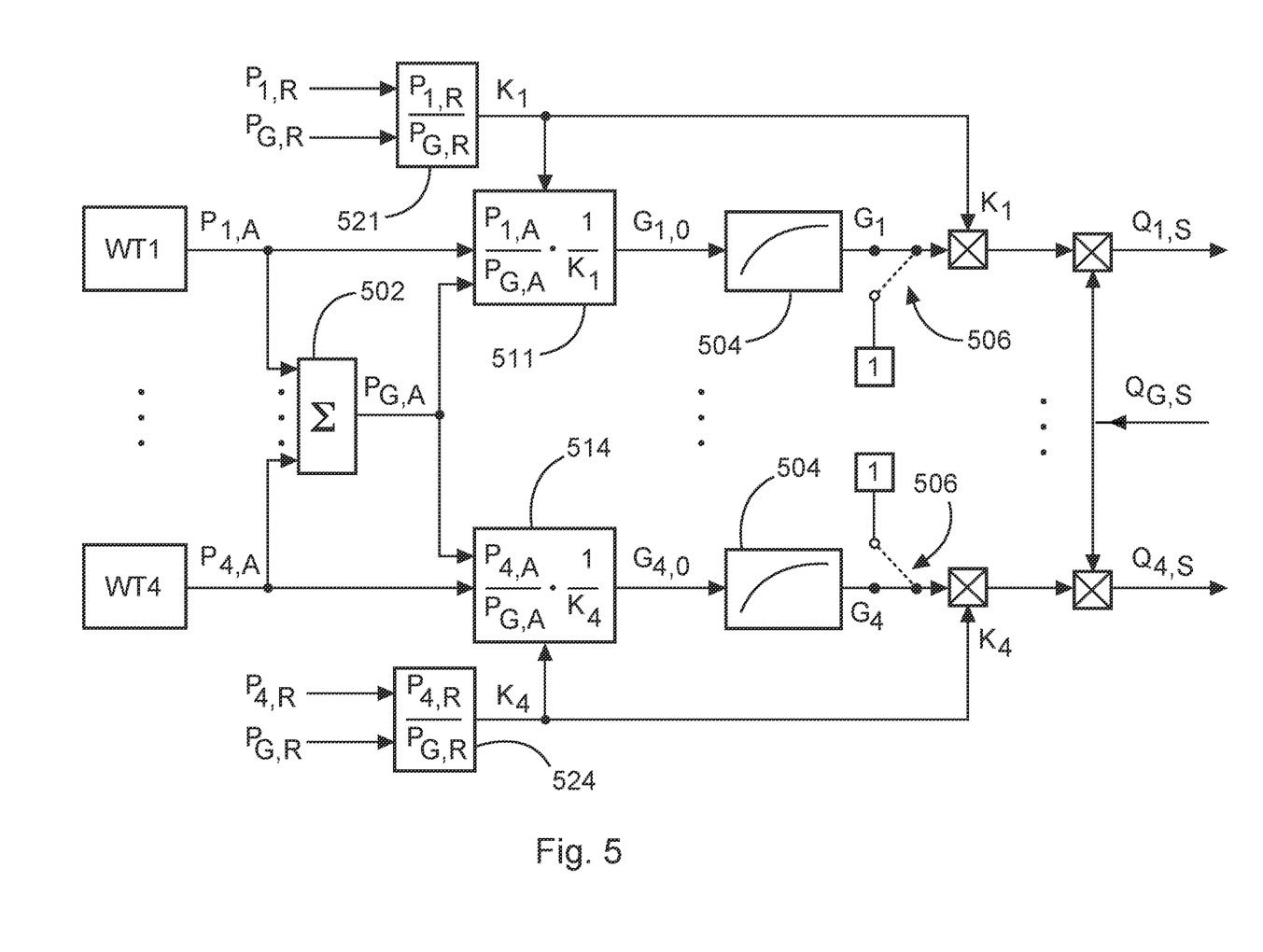
FIG. 5 shows a possible scheme for calculating the individual plant reactive power output to be set.

FIG. 5 shows a structure for calculating, for each wind turbine, an individual plant reactive power output to be generated. FIG. 5 is based, for the sake of simplicity and in line with FIGS. 3 and 4, on a wind farm comprising four wind turbines WT1-WT4. For the sake of greater clarity, only the first and fourth wind turbines WT1 and WT4 are indicated as blocks. Each wind turbine outputs a respective value for the currently generated plant active power output $P_{1,A}$ to $P_{4,A}$. All these values for the plant active power generated are entered into a summing element 502, which thus calculates by summation the currently generated wind farm active power output $P_{G,A}$. A total wind farm reactive power $Q_{G,S}$ to be fed in by the wind farm is also calculated, which may be specified by an external source. In any case, it is drawn into FIG. 5 as a known variable.

For each of the wind turbines WT1 to WT4, the individual plant reactive power output to be generated can be calculated from these values, namely, for each wind turbine WT1-WT4, one of the individual plant reactive power outputs $Q_{1,S}$ to $Q_{4,S}$ to be generated. To that end, and for the first WT1 wind turbine, for example, the currently generated plant active power output $P_{1,A}$ could be divided by the currently generated wind farm active power output $P_{G,A}$, and this quotient could be multiplied by the value of the wind farm reactive power $Q_{G,S}$ to be fed in by the wind farm. This is an embodiment that is simpler than the one shown in FIG. 5.

According to the variant shown in FIG. 5, dynamic tracking is also provided. The calculation structure shown in FIG. 5 also provides the option of calculating the individual plant reactive power outputs $Q_{1,S}$ to $Q_{4,S}$ to be generated, even if there is a communication failure in the wind farm, such that the values of the currently generated plant active power outputs $P_{1,A}$ to $P_{4,A}$ are not known. A non-optimal distribution may be acceptable in this case of malfunction.

In any case, a weighting block 511, 514 that determines a respective initial weighting value $G_{1,0}$, $G_{4,0}$ is provided for each wind turbine. This initial weighting value $G_{1,0}$, $G_{4,0}$ is inputted via a lag element 504 to produce the tracked weighting value $G_1$, $G_4$. Lag element 504 can be configured as a first-order lag element, with a gain of 1. The tracked weighting value $G_1$, $G_4$ thus obtained, which is variable due to the delayed tracking, is then multiplied by a basic value $K_1$, $K_4$. The result is multiplied, finally, by the value of the wind farm reactive power $Q_{G,S}$ to be fed in, thus producing the respective individual plant reactive power output $Q_{1,S}$, $Q_{4,S}$ to be generated.

The basic value $K_1$, $K_4$ results from the quotient of the respective wind turbine rated power $P_{1,R}$, $P_{4,R}$ divided by the wind farm rated power $P_{G,R}$. This quotient is calculated in specification calculation block 521, 524. The result is therefore the basic value $K_1$, $K_4$, which thus specifies a ratio for distributing the wind farm reactive power to be fed in, depending purely on the rated powers. If communication is interrupted, or some other malfunction occurs that prevent the values of the currently generated active power outputs from being known, the respective individual plant reactive power outputs $Q_{1,S}$, $Q_{4,S}$ to be generated can be calculated depending purely on this basic value $K_1$, $K_4$, multiplied by the total wind farm reactive power $Q_{G,S}$ to be fed in by the wind farm. An exception switch 506 is provided in each case, which can be switched in such a way that the basic value $K_1$, $K_4$ is multiplied only by the value 1.

However, this exception switch 506 is normally closed, as also shown in FIG. 5. The weighting then has its effect. The basic weighting value $G_{1,0}$, $G_{4,0}$ is calculated accordingly from the ratio of the currently generated plant active power output $P_{1,A}$, $P_{4,A}$ to the currently generated wind farm active power output $P_{G,A}$, whereby the basic value $K_1$, $K_4$ is additionally calculated, since the weighting determined here is to be multiplied by the basic value $K_1$, $K_4$, which in the stationary state in any case is then eliminated as a result. However, in the case of communication failure as described above, this basic value $K_1$, $K_4$ is necessary when exception switch 506 is open.

The basic weighting value $G_{1,0}$, $G_{4,0}$ is calculated accordingly and it can be tracked using the lag function 504.

Lag function 504, in particular, is also used for illustration purposes. Another way that tracking can lag is if, instead of or in addition to lag element 504, the measured values of the wind turbines, i.e., the currently generated plant active power outputs $P_{1,A}$, $P_{4,A}$, are calculated with a corresponding lag, or are updated so as to be taken into account when calculating the individual plant reactive power outputs to be generated. Such a lag can be provided additionally or alternatively for applying the wind farm reactive power $Q_{G,S}$.

The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A method of feeding electric reactive power into an electrical supply network at a grid connection point using a wind farm including one or more wind turbines, the method comprising:
   calculating a wind farm reactive power output value to be fed in by the wind farm, wherein:
      the wind farm feeds a wind farm active power output into the electrical supply network, and the wind farm active power output includes individual plant active power outputs respectively generated by: the one or more wind turbines or the one or more wind turbines and one or more additional power generation plants, and
      the wind farm feeds a wind farm reactive power output into the electrical supply network, and the wind farm reactive power output includes individual plant reactive power outputs respectively generated by the one or more wind turbines or the one or more wind turbines and the one or more additional power generation plants; and calculating, for each wind turbine of the one or more wind turbines or for each wind turbine of the one or more wind turbines and for each additional power generation plant of the one or more additional power generation plants, an individual plant reactive power output value to be generated by the wind turbine or the additional power generation plant, respectively, wherein:

calculating the individual plant reactive power output value includes determining the individual plant reactive power output value for each wind turbine or each additional power generation plant depending on:

an individual plant active power output of the respective wind turbine or the respective additional power generation plant;

the wind farm reactive power output value to be fed in by the wind farm; and all the individual plant active power outputs generated by: the one or more wind turbines or the one or more wind turbines and the one or more additional power generation plants.

2. The method according to claim 1, comprising:
determining the individual plant reactive power output values and generating the individual plant reactive power outputs such that a sum of all the individual plant reactive power outputs is equal to the wind farm reactive power output.

3. The method according to claim 1, comprising:
determining the individual plant reactive power output as:

$Q_{N,S}=(P_{N,A}/P_{G,A})*Q_{G,S}$, wherein $Q_{G,S}$ is the wind farm reactive power output value to be fed in, $P_{G,A}$ is the wind farm active power output that is fed in, $P_{N,A}$ is the respective individual plant active power output that is fed, and N is an index representing the wind turbine or the additional power generation plant.

4. The method according to claim 1, comprising:
calculating the individual plant reactive power output value by a central wind farm controller.

5. The method according to claim 1, comprising:
calculating the individual plant reactive power output value depending on the wind farm reactive power output that is fed in.

6. The method according to claim 1, wherein a ratio of the individual plant reactive power output to the individual plant active power output is the same for each wind turbine or additional power generation plant.

7. The method according to claim 1, comprising:
calculating the individual plant reactive power output value from the wind farm reactive power output value to be fed in using an individual conversion function having:
a predeterminable basic value which is specific for each wind turbine or additional power generation plant; and
a variable weighting that is specific for each wind turbine or additional power generation plant, wherein the variable weighting is calculated depending on the individual plant active power output of the wind turbine or additional power generation plant.

8. The method according to claim 7, comprising:
calculating the individual plant reactive power output as:

$Q_{N,S}=k_N*G_N*Q_{G,S}$, wherein $Q_{G,S}$ is the wind farm reactive power output value to be fed, $k_N$ is the basic value, $G_N$ is the variable weighting, and N is an index of the wind turbine or additional power generation plant.

9. The method according to claim 8, wherein:
each wind turbine and additional power generation plant has a plant rated power ($P_{N,R}$);
the wind farm has a wind farm rated power ($P_{G,R}$) that is a sum of all plant rated powers ($P_{N,R}$); and
the basic value ($k_N$) for a respective wind turbine or additional power generation plant is a ratio of the plant rated power ($P_{N,R}$) of the respective wind turbine or additional power generation plant to the wind farm rated power ($P_{G,R}$).

10. The method according to claim 9, wherein the variable weighting ($G_N$) represents a ratio between:
a ratio of the respective individual plant active power output ($P_{N,A}$) to the wind farm active power output ($P_{G,A}$); and
a ratio of the plant rated power ($P_{N,R}$) to the wind farm rated power ($P_{G,R}$).

11. The method according to claim 10, wherein the variable weighting ($G_N$) is represented as:

$G_{N,0}=(P_{N,A}/P_{G,A})/(P_{N,R}/P_{G,R})$ where $G_N=G_{N,0}$, or $G_N$ tracks $G_{N,0}$ using a dynamic function.

12. The method according to claim 10, wherein $G_{N,0}=(P_{N,A}/P_{G,A})/(P_{N,R}/P_{G,R})$, and the variable weighting ($G_N$) tracks $G_{N,0}$ with a first-order delay behavior.

13. The method according to claim 1, comprising:
in response to a change in the fed-in individual plant active power output and/or in the fed-in wind farm active power output,
refraining from adjusting the individual plant reactive power output until a predetermined time lag expires,
refraining from adjusting the individual plant reactive power output with an additional application of a dynamic tracking function, or
refraining from adjusting the individual plant reactive power output based on a current wind power of the wind farm.

14. The method according to claim 1, wherein, if at least one individual plant active power output is unavailable for calculating the individual plant reactive power output value to be generated, the individual plant reactive power output value to be generated is determined temporarily for the wind turbine or additional power generation plant from the wind farm reactive power output value to be fed in and by using a predetermined default value.

15. The method according to claim 1, comprising:
calculating the individual plant reactive power output to be generated depending on at least one criterion selected from a list of criteria including:
power line losses of the wind farm;
a cable factor having, as a weighting factor, a distance of the wind turbine to the grid connection point, or a grid attenuation, or a grid gain of an introduced reactive current;
a fixed converter factor that is specified depending on an infeed inverter and which have, as a weighting factor, a predefined converter efficiency;
a dynamic converter factor which takes into account detected properties of the infeed inverter;
a dynamic converter factor which takes into account a currently detected efficiency of the infeed inverter;
an overload factor which takes into account a duration and/or magnitude of an overload;

an expected or forecast power output; and a reserve factor which takes into account possible changes in active power generation in order to perform a system service, wherein the individual plant reactive power output value to be generated is reduced compared with an individual plant reactive power output which does not take the reserve factor into account.

16. A wind farm including a plurality of wind turbines for feeding electric reactive power into an electrical supply network at a grid connection point, comprising:

a wind farm control controller configured to:

determine a wind farm reactive power output value to be fed in by the wind farm, wherein the wind farm is configured to be operated such that:

the wind farm feeds a wind farm active power output into the electrical supply network, and the wind farm active power output includes individual plant active power outputs respectively generated by: the plurality of wind turbines, or the plurality of wind turbines and one or more additional power generation plants; and the wind farm feeds a wind farm reactive power output into the electrical supply network, and the wind farm reactive power output includes individual plant reactive power outputs respectively generated by: the plurality of wind turbines or the plurality of wind turbines and one or more additional power generation plants; and calculate, for each wind turbine of the plurality of wind turbines or for each wind turbine of the plurality of wind turbines and for each additional power generation plant of the one or more additional power generation plants, an individual plant reactive power output value to be generated by the wind turbine or the additional power generation plant, respectively, wherein calculating the individual plant reactive power output value includes determining the individual plant reactive power output value for each wind turbine or additional power generation plant depending on:

an individual plant active power output of the respective wind turbine or the respective additional power generation plant;

the wind farm reactive power output value to be fed in by the wind farm; and all the individual plant active power outputs generated by: the plurality of wind turbines or the plurality of wind turbines and the one or more additional power generation plants.

* * * * *